United States Patent

Hackett et al.

[15] 3,691,239
[45] Sept. 12, 1972

[54] PROCESS FOR PURIFICATION OF ETHYLENE DICHLORIDE

[72] Inventors: Homer L. Hackett, Ponca City, Okla. 74601; Edmond A. Peveto, Westlake, La., 70669

[73] Assignee: Continental Oil Company, Ponca City, Okla.

[22] Filed: May 5, 1969

[21] Appl. No.: 822,020

[52] U.S. Cl. ........... 260/652 P, 260/659 A, 260/660, 260/662 R
[51] Int. Cl. .............................................. C07c 19/02
[58] Field of Search..... 260/652 P, 654 S, 658 R, 659 R, 260/659 A, 660, 662 R, 662 A, 663

[56] References Cited

UNITED STATES PATENTS

| | | |
|---|---|---|
| 2,852,572 | 9/1958 | Shukys et al. ........... 260/652 P |
| 3,159,455 | 12/1964 | Skaperdas et al. ..260/659 A X |

FOREIGN PATENTS OR APPLICATIONS

| | | |
|---|---|---|
| 147,577 | 11/1962 | U.S.S.R. .................. 260/652 P |
| 13,018 | 7/1966 | Japan ..................... 260/652 P |
| 939,936 | 10/1963 | Great Britain.......... 260/652 P |

OTHER PUBLICATIONS

Schilow, Zeitschrift fuer Physikalische Chemie, Band 99– 100, pp. 427– 429, QD1Z45 and attached abstract.

Chemical Society Annual Reports, Zeolites as Absorbents and Molecular Sieves, XVI, pp. 31– 46, QD1-C– 57.

*Primary Examiner*—Leon Zitver
*Assistant Examiner*—Joseph A. Boska
*Attorney*—Joseph C. Kotarski, Henry H. Huth, Jerry B. Peterson, Robert B. Coleman, Jr. and Carroll Palmer

[57] ABSTRACT

Adsorbents such as bauxite, fuller's earth, activated bentonite, etc., are disclosed as being effective in removing metal salts and acidic impurities from ethylene dichloride.

5 Claims, No Drawings

PROCESS FOR PURIFICATION OF ETHYLENE DICHLORIDE

BACKGROUND OF INVENTION

Ethylene dichloride is well known intermediate for the manufacture of vinyl chloride which in turn can be polymerized and formed into valuable plastic articles.

In many of the known processes for making ethylene dichloride, such as the so-called "Direct Chlorination" and the "Oxy Chlorination" methods, the crude product contains small amounts of dissolved metal salts and acidic impurities. It is usually necessary to reduce these impurities to very low levels before the ethylene dichloride is further processed since they can present a corrosion problem and even promote undesirable side reactions.

These impurities are removed by the most common commercial practice at this time by first contacting the ethylene dichloride with a dilute acid to remove most of the metal components such as chlorinated iron compounds which are nearly always present because of corrosion and also ferric chloride which is often used as a catalytic ingredient in the "Direct Chlorination" method.

The acid-washed ethylene dichloride is then contacted with dilute caustic to further aid removal of metal compounds and to neutralize the acidic components.

Those acid and caustic washings suffer from several disadvantages. The acid-caustic salt is not completely removed from the desired product. The operations are costly and require careful control. The waste acid and caustic solutions must be disposed of presenting a pollution problem. Appreciable quantities of the ethylene dichloride is lost in the wash solution both in solution and suspension. The ethylene dichloride is left in a moist condition which requires drying in order to prevent corrosion and other processing problems.

SUMMARY OF INVENTION

It has now been found that acidic and metal salt impurities can be removed from raw ethylene dichloride by contacting the impure mixture with an adsorbent.

DESCRIPTION OF PREFERRED EMBODIMENT

While the ethylene dichloride (EDC) can be contacted with the adsorbent batchwise, preferably the adsorbent will be packed into a column and the EDC continuously passed thereover. Temperatures and pressures would have the expected effect, e.g., low temperatures and high pressures favor adsorption mechanism; however, we have had excellent results operating at essentially ambient conditions and thus expensive heating, cooling, pressuring or vacuum equipment is not needed and would not ordinarily be employed.

As has been stated, the feed material is raw ethylene dichloride containing metal salts, particularly iron chloride, and acidic impurities. Generally the acidic impurity will be HCl.

Adsorbents, in general, are operable in this invention, however, we prefer natural or modified clays and clay related materials such as alumina, attapulgus clay, fuller's earth, bentonite, diatomaceous earth, and natural and synthetic zeolites. Alumina in its bauxite form may be used. Examples of other operable adsorbents include silica gels, activated charcoal, talc, anhydrous calcium sulfate, magnesium sulfate and the like. Preferably, the adsorbents will be dried before use since the EDC will elude adsorbed moisture as is shown in a working example below.

When EDC is contacted with a dry adsorbent, particularly those specified above, the metal and acidic impurities such as ferric chloride and HCl, respectively, will be materially reduced as will the water content. If the adsorbent is not first completely dried, the moisture content of the EDC will initially increase until equilibrium conditions are reached. The moisture can then be removed by contacting the treated EDC with a drying agent. It is believed the two runs below will suffice to teach those skilled in the art to use the invention in its preferred embodiments. In view of the foregoing description, those skilled in the art will be able to modify the conditions for the particular conditions, e.g., impurity level and adsorbent, desired.

RUN 1

Bauxite (30/60 mesh, 103.7 gm) was placed between -inch wool plugs in a glass tube forming a cylindrical bauxite bed approximately 8 inches long and ¾-inch in diameter. Ethylene dichloride containing 25 ppm hydrogen chloride and 33 ppm water was pumped through the bed at approximately 25 ml per minute. The product EDC was collected in four fractions, with the analysis shown below:

| Fraction | Weight (gm) | Analysis HCl ppm | $H_2O$ ppm |
|---|---|---|---|
| 1 | 418 EDC | nil | 356 |
| 2 | 1250 EDC | nil | 269 |
| 3 | 1250 EDC | nil | 119 |
| 4 | 1250 EDC | nil | 90 |

This shows that all of the HCl was still being removed by the bauxite even after 4,168 grams (approx. 3,340 ml) of EDC had passed through the bed. In view of the strong affinity of bauxite for $H_2O$, it was surprising that the water was removed. When an anhydrous bauxite is used, the water content is substantially lowered.

RUN 2

Two runs were made to show the effect of bauxite in removing ferric chloride and free chlorine from crude EDC.

a. Crude ethylene dichloride, feed to vinyl chloride monomer plant, was passed slowly through a 100 cc bed of oven-dried bauxite using the apparatus described in Run 1. The crude EDC was greenish-yellow in color, presumably due to dissolved ferric chloride and chlorine. The effluent was only faintly colored. The analytical results are shown in 2(a) below.

b. Another 500 ml portion of the above crude EDC was shaken with an equal amount of water in a separatory funnel and the water layer discarded. The water wash removed the major portion of the dissolved chlorine and part of the ferric chloride. The partially purified EDC was then passed through a bed of fresh bauxite as in 2(a). The effluent from this run was essentially free of color. The analysis from this run is shown as 2(b) below.

| Analysis | FeCL$_3$* ppm | Free CL$_2$ Wt. % |
|---|---|---|
| Crude EDC | >>42 | .074 |
| 2(a) effluent | <5 | .023 |
| 2(b) effluent | <5 | .006 |

The concentration of ferric chloride in the crude EDC exceeded and the ferric chloride in the effluent was below the range of the analytical procedure used.

Having thus disclosed our invention, we claim:

1. A process for removing impurities comprising hydrogen chloride and ferric chloride from ethylene dichloride which comprises contacting the impure ethylene dichloride in the liquid state with an adsorbent as the sole essential purification ingredient, said adsorbent being alumina, and separating the purified ethylene dichloride from the adsorbent.

2. The process of claim 1 wherein the impure ethylene dichloride is continuously passed through a packed column containing the adsorbent as the essential packing material.

3. The process of claim 1 wherein the impure ethylene dichloride is agitated with the adsorbent batch-wise in a stirred vessel.

4. The process of claim 1 wherein the impure ethylene dichloride is continuously passed through a packed column containing the adsorbent as the essential packing material.

5. A process according to claim 1 wherein the alumina is in the form of bauxite.

* * * * *

PO-1050
(5/69)

UNITED STATES PATENT OFFICE
CERTIFICATE OF CORRECTION

Patent No. 3,691,239      Dated September 12, 1972

Inventor(s) Homer L. Hackett and Edmond A. Peveto

It is certified that error appears in the above-identified patent and that said Letters Patent are hereby corrected as shown below:

IN THE SPECIFICATION:

Page 1, Column 2, Line 25, please delete "-inch" and insert therefor --glass--.

IN THE CLAIMS:

Claim 3, Line 1, please change "1" to --5--.

Claim 4, Line 1, please change "1" to --5--.

Signed and sealed this 30th day of January 1973.

(SEAL)
Attest:

EDWARD M. FLETCHER, JR.
Attesting Officer

ROBERT GOTTSCHALK
Commissioner of Patents